April 13, 1926.
L. K. DE BUS
MEASURING DEVICE
Filed April 29, 1921
1,580,813
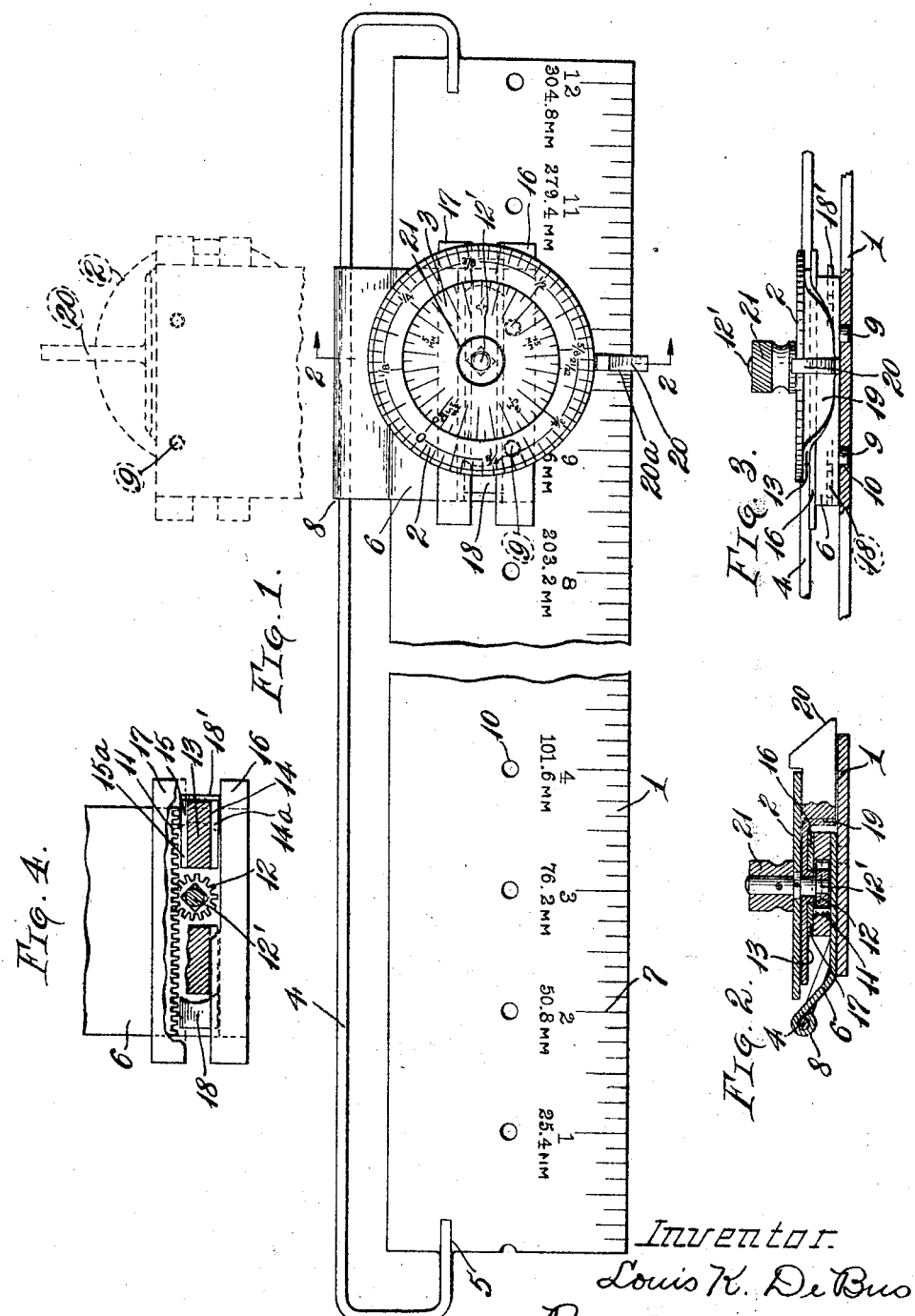
Inventor.
Louis K. DeBus
By Brockett & Hyde
Attys.

Patented Apr. 13, 1926.

1,580,813

UNITED STATES PATENT OFFICE.

LOUIS K. DE BUS, OF CINCINNATI, OHIO.

MEASURING DEVICE.

Application filed April 29, 1921. Serial No. 465,477.

*To all whom it may concern:*

Be it known that I, LOUIS K. DE BUS, a citizen of the United States, residing at Cincinnati, in the county of Hamilton and State of Ohio, have invented certain new and useful Improvements in Measuring Devices, of which the following is a specification.

This invention relates to improvements in measuring instruments.

The objects of this invention are to provide a measuring rule with means for facilitating the reading of small fractional measurements, as for instance thirty-seconds, sixty-fourths and even smaller parts of an inch; also to provide means for reading millimeters with equal facility and to simplify the translation of measurements from terms of one system into terms of another system.

Other objects of this invention will be apparent from the following description and claims when considered together with the accompanying drawings.

Fig. 1 is a top plan view of my device showing the slidable attachment thrown back in dotted line position; Fig. 2 is a section on line 2—2, Fig. 1; Fig. 3 is a front elevation of part of the device showing the attachment in position; and Fig. 4 is a plan view of the carriage with parts broken away.

With the ordinary measuring rule it is quite difficult to read the exact measurement because of the fineness of the spacing between the marks on the rule. With the present device the coarse reading is made in inches or in terms of the metric system from the main part 1 of the rule and the fine reading is then made from the dial 2, if in inches, or from dial 3, if in terms of the metric system. The coarse and fine readings are then added to obtain the correct measurement.

The main part 1 of the rule is provided with a rod 4 whose ends are set in the ends of the rule as at 5 and soldered or secured in any other suitable manner so as to be flush with the faces of the rule. This rod extends beyond the ends of the rule so as to permit the slidable adjustment of the carriage 6 along the rod 4 throughout the full length of the scale 7 marked on the rule. In the present case I have shown a scale expressed in terms of inches as well as in terms of the metric system although, when used for measurements or less than an inch, as for instance in the work of jewelers, the scale can be omitted from the rule or guide 1, the reading being then made entirely from the dial. The carriage 6, which carries the dials 2 and 3, is swiveled at 8 upon the rod 4 and is provided upon its under face with slightly tapered pins 9 for precise registering engagement with the holes 10 formed in the rule 1 at points opposite the inch marks.

The attachment 6 is provided with a rackway 11 for co-operation with a pinion 12 carried by the lower end of the pin 12' upon which is mounted the dial plate. The pin 12' is rotatably mounted upon a slide member 13 which is provided with grooves 14, 15 formed by strips 14$^a$ and 15$^a$ secured in any suitable manner to the underside of member 13, for slidable engagement with the overhanging strips 16, 17 on the attachment 6. Strips 16 and 17 may be secured to the upper surface of rack bars 11, as for instance by soldering, or in any other suitable manner so as to provide a slidable engaging means. Stops 18 and 18' are provided upon the bottom of the slide-way so as to limit the movement of the attachment along the rack. The slide member 13, which is of disc form, has its front edge portion turned down as a flange 19, which carries the finger or indicator 20. This finger has close contacting engagement with the face of the rule and will move along the rule upon turning the pinion 12 by means of the knurled button 21 which is threaded on the pin 12'. The top edge of the finger 20 is cut down so as to provide a seat for the lower face of the dial plate. The parts are so constructed and arranged that one complete rotation of the dial plate corresponds to one inch, which means that during a complete rotation of the dial plate the finger 20 will travel one inch along the rule. However, it might be desirable in some instances to manufacture these measuring devices with a rack and pinion wherein one revolution of the pinion would carry the measuring device more or less than an inch. This form of construction would be desirable if the dial were used on a rule or scale divided for the metric system, in which case it would be desirable to have the pinion travel on the rack a fractional part of a meter. The dial plate, which may be formed of brass or other suitable material, will be subdivided around its outer portion 2 into as small fractions of an inch as may be desired by engraving the same thereupon or in any other suitable manner. The inner smaller dial 3, which is here shown as being formed integral with the outer dial, has engraved thereupon millimeters corresponding to one inch, that is, 25.4 millimeters. Still finer measurements can be indicated upon the dials, if so desired. As will be apparent both of the dials can be read at the same time, and the zero marks on the two dials coincide. The middle part of the pin or hub 12' is square in cross section so that the dials will move therewith and if desired the dial 3 can be formed separatly and set down over the same squared hub portion and clamped in position upon the dial 2 by means of the button 21. The button 21 can be locked in position in any suitable manner if so desired.

The operation is briefly stated as follows. The one end of the rule is placed at the end of the object to be measured and if for instance the other end of the object terminates between the 9 and 10 inch marks, the attachment is set so as to bring the finger 20 between the marks 9 and 10. The attachment is so positioned by moving it along the rod and dropping the pins 9 into the holes 10. Then starting with the zero of the dial opposite the reading edge 20$^a$ of the finger 20, which finger is then at 9, the dial is turned until the edge 20$^a$ coincides with the end of the object. Then the dial is read at the edge 20$^a$ and this reading added to the nine inches to obtain the correct measurement.

Or, if it is desired to obtain the measurement in terms of the metric system, the number of millimeters read upon the inner dial, opposite the edge 20$^a$, is added to the number of millimeters, 228.6, in this case, found at the inch mark on the rule.

Then too, if it should be desired to translate a measurement from terms of inches into millimeters, or vice versa, this can be done by setting the slidable carriage so as to permit the finger 20 to be adjusted between the numbers of inches next above and next below the number given in the measurement. Of course the dial is then set with its zero mark at the edge 20$^a$. Then by adjusting the dial with respect to the edge 20$^a$ so as to count off the remaining fractional part of an inch, the corresponding reading in millimeters at the edge 20$^a$ when added to the number of millimeters read from the main part of the rule and corresponding to the whole number of inches will give the correct measurement in millimeters.

Some of the advantages flowing from this invention are the greater facility with which a fine measurement can be read, in either terms of inches or terms of the metric system, and also the simplified method of translating a measurement from terms of one system to terms of another system. Among the several uses to which this device might be put is its use as a depth gauge. Other advantages will readily suggest themselves to those who are familiar with the art to which it relates.

I do not restrict myself to the particular form and details of structure here shown since the present disclosure is merely for purposes of illustration and might be modified to meet different conditions and uses without departing from the spirit of my invention.

What I claim is:

1. A measuring device comprising a rule with units of measurements indicated thereon, a finger movable along said rule for co-operation therewith, and means co-operating with said finger and movable along said rule and substantially within the lateral limits thereof for indicating fractional parts of said unit of measurement.

2. A measuring device comprising a rule with units of measurement indicated thereon, a finger movable along said rule for co-operation therewith, means co-operating with said finger and movable along said rule for indicating fractional parts of said unit of measurement, and means located within the lateral limits of said rule for setting said means at predetermined points along said rule.

3. A measuring device comprising a rule with units of measurements indicated thereon, a finger movable along said rule for co-operation therewith, and rotary means co-operating with said finger and movable along said rule and substantially within the lateral limits thereof for indicating fractional parts of said unit of measurement.

4. A measuring device comprising a rule with units of measurement indicated thereon, a carriage movable along said rule and having an indicating finger for co-operation with the indications upon said rule, and means for moving said indicating finger relatively to said carriage through a unit of measurement, said carriage being provided with a scale extending in substantially a single plane for indicating fractional parts of said unit of measurement according to the position of said finger.

5. A measuring device comprising a rule with units of measurement indicated thereon, a carriage slidably and swingingly mounted for movement along and toward and away from said rule, respectively, and having an indicating finger for co-operation with the indications upon said rule, and means for moving said indicating finger through a unit of measurement, said carriage being provided with a scale for indicating fractional parts of said unit of measurement according to the position of said finger.

6. A measuring device comprising a rule with units of measurements indicated thereon, a carriage movable along said rule and having an indicating finger for co-operation with the indications upon said rule, and means rotatable upon said carriage and in a plane substantially parallel with said rule for moving said indicating finger relatively to said carriage through a unit of measurement, said carriage being provided with a scale indicating fractional parts of said unit of measurement according to the position of said finger.

7. A measuring device comprising a rule with units of measurement indicated thereon, a carriage movable along said rule and having an indicating finger for co-operation with the indications upon said rule, a dial rotatable upon said carriage for indicating fractional parts of said unit of measurement, said indicating finger being movable on said carriage along said rule, and means for actuating said finger and dial so as to indicate fractional parts of said unit of measurement according to the position of said finger.

8. A measuring device comprising a rule with units of measurement indicated thereon, a carriage movable along said rule and having an indicating finger for co-operation with the indications upon said rule, a dial upon said carriage for indicating fractional parts of said unit of measurement, said indicating finger being movable on said carriage along said rule, and rotary means for actuating said finger and indicating fractional parts of said unit of measurement, according to the position of said finger.

9. A measuring device comprising a rule with units of measurement indicated thereon, a carriage movable along said rule and having an indicating finger for co-operation with the indications upon said rule, means confined substantially within the lateral limit of said rule for setting said carriage at predetermined points along said rule, and means for moving said indicating finger on said carriage through a unit of measurement, said carriage being provided with a scale for indicating fractional parts of said unit of measurement according to the position of said finger.

10. A measuring device comprising a rule with corresponding measurements of different systems indicated thereon, a finger movable along said rule for co-operation therewith, a dial movable along said rule and rotatable in a plane substantially parallel therewith for co-operation with said finger to indicate corresponding fractional parts of units of said systems of measurement.

11. A measuring device comprising a rule with units of measurement indicated thereon, a carriage movable along said rule and having an indicating finger movable thereon along said rule for co-operation with the indications upon said rule, a dial upon said carriage for indicating fractional parts of said unit of measurement, and means for actuating said finger and indicating fractional parts of said unit of measurement upon said dial according to the position of said finger, said means including rack and pinion mechanism.

12. A measuring device comprising a guide member, a finger movable along said guide member, a rotatable dial movable without rotation along said guide member and adapted for rotation in a plane substantially parallel with said guide member to indicate fractional parts of a unit of measurement.

13. A measuring device, comprising a guide member, a finger movable along said guide member, said finger having an edge adapted to engage the work and also to serve as a reading edge, and a dial rotatable in a plane substantially parallel with said guide member for co-operation with said reading edge to indicate fractional parts of a unit of measurement.

14. A measuring device comprising a guide member, a finger having a reading edge and movable along said guide member, a dial rotatable in a plane substantially parallel with said guide member for co-operation with said reading edge to indicate fractional parts of units of measurement of different systems.

15. A measuring device comprising a rule with units of measurement indicated thereon, a carriage movable along said rule and having an indicating finger for co-operation with the indications upon said rule, a rotatable dial movable with said carriage without rotation thereof, means for setting said carriage in predetermined positions along said rule corresponding to full units of measurement, and means for moving said indicating finger relatively to said carriage through a unit of measurement, said carriage being provided with a scale extending in substantially a single plane for indicating fractional parts of said unit of measurement according to the position of said finger.

In testimony whereof I hereby affix my signature.

LOUIS K. DE BUS.